United States Patent [19]

Kasiewicz

[11] 4,257,361
[45] Mar. 24, 1981

[54] CONTROL CIRCUIT FOR ENGINE SPEED GOVERNOR

[76] Inventor: Stanley J. Kasiewicz, 29852 Springhill Dr., Southfield, Mich. 48076

[21] Appl. No.: 47,544

[22] Filed: Jun. 11, 1979

[51] Int. Cl.³ ............................................. F02D 11/10
[52] U.S. Cl. ..................................... 123/352; 123/340
[58] Field of Search ...................... 123/102; 180/105 E

[56] References Cited

U.S. PATENT DOCUMENTS

| | | |
|---|---|---|
| 3,952,829 | 4/1976 | Gray ........................................ 123/102 |
| 3,998,191 | 12/1976 | Beyerlein . |
| 4,090,480 | 5/1978 | Kasiewicz . |
| 4,134,373 | 1/1979 | Kibler . |
| 4,177,516 | 12/1979 | Mason . |
| 4,181,103 | 1/1980 | Sturdy . |

Primary Examiner—Ronald B. Cox
Attorney, Agent, or Firm—Reising, Ethington, Barnard, Perry & Brooks

[57] ABSTRACT

A control circuit for a speed governor is disclosed which provides governing action at a preset governed speed by means of a reversible electric motor. An engine speed signal generator is coupled with a logic circuit which controls a pair of driver transistors for the motor. An acceleration logic circuit is operative to invoke governing action before the governed speed is reached if the acceleration exceeds a predetermined value. Also an overspeed logic circuit is operative to allow the motor to be driven in the close throttle direction beyond its normal reference position so long as an overspeed condition exists.

10 Claims, 1 Drawing Figure

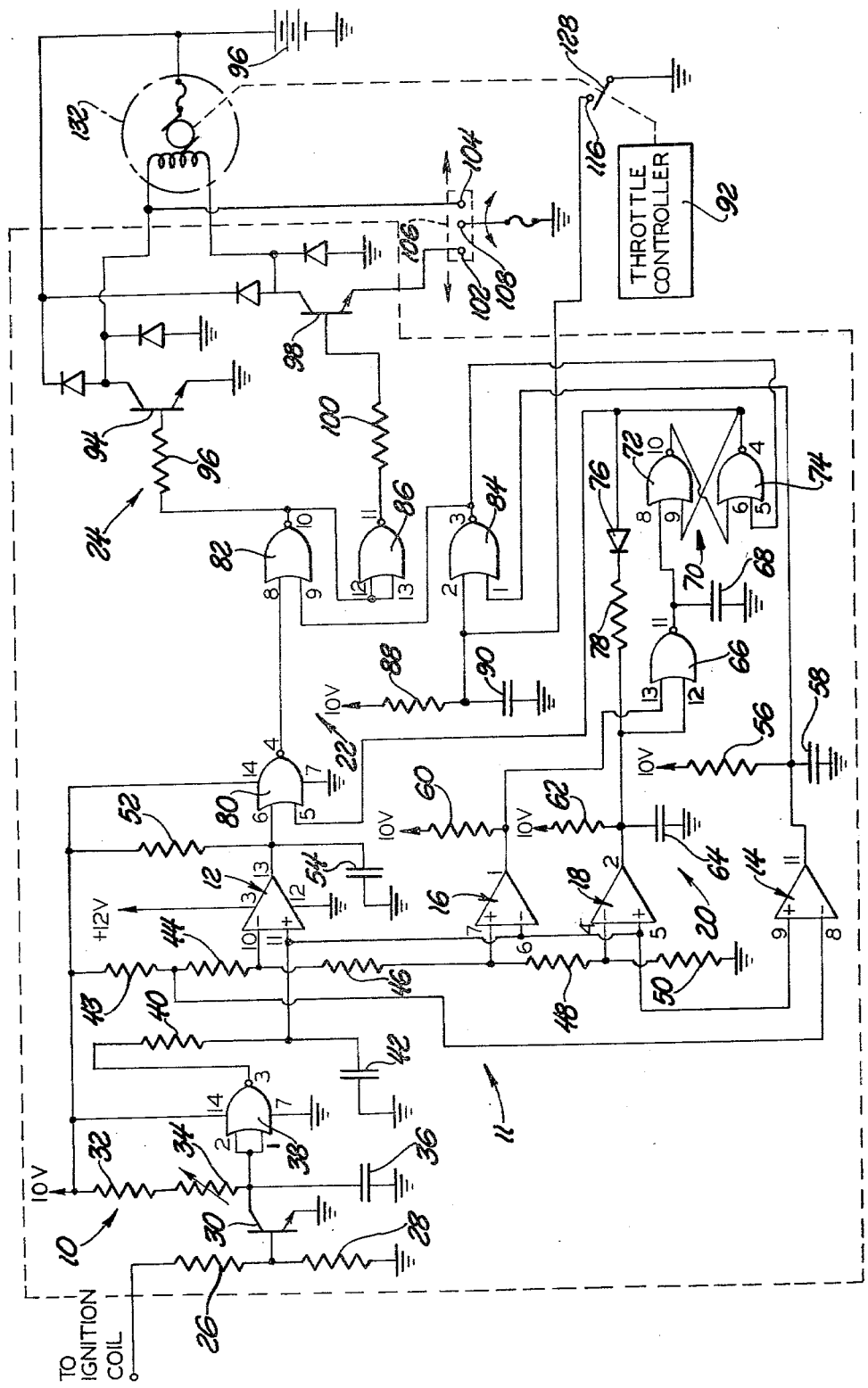

CONTROL CIRCUIT FOR ENGINE SPEED GOVERNOR

TECHNICAL FIELD

This invention relates to speed governors for engines and more particularly it relates to an electronic control circuit for speed governors.

BACKGROUND ART

Engine speed governors are commonly used on internal combustion engines in many different applications. Typical applications are for vehicle engines of trucks and buses. As is well known, speed governors are employed for the purposes of limiting operating speeds and for protecting the engines from damage due to overspeeding.

Combined engine and load speed governors have been developed which are responsive to both engine speed and vehicle speed for controlling or limiting the engine speed. A governor of this type is disclosed in U.S. patent application Ser. No. 794,615 filed by Harry D. Sturdy on May 6, 1977 now U.S. Pat. No. 4,181,103. An electronic control circuit especially adapted for a governor of the type disclosed in said patent application is disclosed and claimed in my U.S. Pat. No. 4,090,480 granted May 23, 1978.

An improved engine and load speed governor has been developed which allows the engine to be accelerated to its predetermined speed limit with small overshoot beyond that limit and which quickly regulates the engine speed close to the predetermined limit with only small deviation. Such action is obtained by positioning the engine throttle to a predetermined reference position upon acceleration of the engine to the predetermined speed and actuation of the engine governor thereby, rather than by driving the throttle toward the fully closed position. The governor functions to safely control engine and load without dynamic surging when operating the engine speed control mode. Additionally, the governor includes an overspeed control which acts to close the throttle beyond the reference position toward the completely closed throttle position in the event of a persistent overspeed. This improved engine and load speed governor is disclosed and claimed in a U.S. patent application filed by Harry D. Sturdy on or about May 12, 1979 entitled "Engine Governor With Reference Position For Throttle Limiter". A governor of this type is made and sold by Sturdy Truck Equipment, Inc. of Wilmington, North Carolina.

The electronic control circuit of this invention is especially adapted for use with the aforementioned improved engine and speed governor.

SUMMARY OF THE INVENTION

In accordance with this invention, a governor control circuit is provided which is responsive not only to engine speed but also to a predetermined acceleration for invoking governing action. This is effective to minimize overshoot of the governed speed when the operator or operating conditions cause an undesirably high rate of speed increase. This is accomplished by an electronic control system for a reversible motor connected with throttle control means. A first logic means is responsive to a speed signal and is operative to energize the motor in a closed throttle direction when the speed exceeds a predetermined governed value and second logic means is operative to energize the motor in an open throttle direction when the throttle control means reaches a reference position. A third logic means is responsive to a predetermined value of acceleration for energizing the motor in the closed throttle direction before the speed reaches the predetermined governed value. Additionally, fourth logic means is responsive to the speed signal for maintaining energization of the motor in the closed throttle direction until the throttle control means is moved beyond said reference position.

A more complete understanding of the invention may be obtained from the detailed description that follows taken with the accompanying drawings.

DESCRIPTION OF THE DRAWINGS

The single FIGURE of the drawings shows a schematic diagram of the subject invention.

BEST MODE FOR CARRYING OUT THE INVENTION

Referring now to the drawing, an illustrative embodiment of the invention is shown in a control circuit especially adapted for use with an engine speed governor.

As shown in the drawing, the system comprises, in general, a speed signal generator 10 which develops an analog speed voltage and is coupled with an engine speed detector 11. The detector 11 includes a governor comparator 12 and an overspeed comparator 14 for developing respective speed logic signals. The engine speed detector also includes a close throttle comparator 16 and a precall comparator 18 which are coupled with an acceleration logic circuit 20 for developing an acceleration logic signal in response to a predetermined rate of change of the speed signal. The outputs of the governor comparator 12, the overspeed comparator 14 and the acceleration logic circuit 20 are coupled with a sequence control logic circuit 22 which in turn is coupled with the input of a motor energizing circuit 24 for a reversible motor 132.

The governor control circuit is preferably implemented by means of integrated circuits of the CMOS type using standard integrated circuit chips. It is noted that the comparators are suitably provided by a quad comparator chip and the sequence control circuit 22 is provided by a quad NOR gate chip. Also, the acceleration logic circuit 20, together with the speed signal circuit 10, may be implemented using a quad NOR gate.

The speed signal generator 10 develops an analog voltage which is proportional to engine speed. For this purpose, the engine ignition coil impulses are applied as input to a frequency to voltage converter. The input pulses are applied across voltage divider resistors 26 and 28 to the input of a transistor 30 which will turn on once for each ignition pulse. A resistor 32, potentiometer 34 and capacitor 36 form a timing network in the output of the transistor 30. Each time the transistor 30 is turned on, capacitor 36 is fully discharged and when the transistor is off, the capacitor 36 starts to charge. With increasing speed, the transistor turns on and off at a higher frequency and the capacitor 36 is charged to a lesser extent during each switching cycle. The voltage across the capacitor 36 is applied to the input of a NOR gate 38 which has its input pins 1 and 2 tied together and functions as an inverter. The output of the NOR gate 38 is connected across a resistor 40 and a capacitor 42. When the voltage on the capacitor 36 rises to approximately one-half of the supply voltage (10 V.) the NOR gate 38 will change state at its output pin 3 from high to low. When the output is high, the capacitor 42 is charged through the resistor 40 and when the output is low the capacitor is discharged. Accordingly, at high speed the voltage across the capacitor 42 is at a relatively high level because the NOR gate 38 is in a low state for relatively short time intervals. The average voltage which is developed on capacitor 42 is proportional to engine speed with the voltage increasing as speed increases. The speed voltage on capacitor 42 is applied as the input signal to an engine speed detector including the aforementioned comparators.

The governor comparator 12, the overspeed comparator 14, the close throttle comparator 16 and the precall comparator 18 are all adapted to develop speed logic signals in response to the analog speed signal. For this purpose, the speed signal voltage from the capacitor 42 is applied to one input of each of the comparators and a reference voltage is applied to the other input of each of the comparators. The reference voltages are developed by a voltage divider string connected across the supply voltage and including resistors 43, 44, 46, 48 and 50. The governor comparator 12 has its noninverting input pin 11 connected with the speed signal voltage and its inverting input pin 10 connected with the junction of resistors 44 and 46. A time constant circuit including a resistor 52 and a capacitor 54 is connected across the supply voltage and the output pin 13 of the comparator 12 is connected with the junction of the resistor and the capacitor. The governor speed logic signal is developed across the capacitor 54.

The overspeed comparator 14 has its noninverting input connected with the speed signal voltage and the inverting input at pin 8 connected to the junction of resistors 43 and 44. A time constant circuit including a resistor 56 and a capacitor 58 is connected across the supply voltage and the output pin 14 of the overspeed comparator is connected to the junction between the resistor and the capacitor. An overspeed logic signal is developed across the capacitor 58.

The close throttle comparator 16 has its inverting input pin 6 connected with the speed signal voltage and its noninverting input connected to the junction of resistors 46 and 48. The supply voltage is connected through a resistor 60 to the output pin 1 of the comparator 16. The precall comparator 18 has its noninverting input pin 5 connected with the speed signal voltage and its inverting input pin 4 connected to the junction between resistors 48 and 50. A time constant circuit including a resistor 62 and a capacitor 64 is connected across the supply voltage and the output pin 2 of the comparator 18 is connected to the junction of the resistor 62 and capacitor 64. The precall speed signal is developed across the capacitor 64.

In an exemplary embodiment, the governed speed is preset at 4000 RPM and accordingly the governor comparator 12 is adapted to change states at this speed. The overspeed comparator 14 is preset to change states at 4300 RPM. The precall comparator is set at a speed of 3400 RPM and the close throttle comparator 16 is set at 3600 RPM.

In the acceleration logic circuit, a NOR gate 66 has one input pin connected with the output of the precall comparator 18 and the other input pin connected with the output of the close throttle comparator 16. The output pin of the NOR gate 66 is connected across a capacitor 68 to the set input of a flip-flop 70. The flip-flop 70 comprises a NOR gate 72 and a NOR gate 74 in a cross-coupled relationship. Specifically, pin 8 of gate 72 is the set input and pin 5 of gate 74 is the reset input and output pin 4 of gate 74 is the output. The output pin 4 is connected back through a diode 76 and a resistor 78 to the input pin 12 of the NOR gate 66. The output of the flip-flop 70 is also applied to an input of the sequence control logic circuit 22, which will be described subsequently.

The sequence logic circuit 22 comprises a NOR gate 80 having an input pin 6 connected with the output of the governor comparator 12 and having an input pin 5 connected with the output of the flip-flop 70. The output of the NOR gate 80 is applied to an input pin 8 of a NOR gate 82 which has an input pin 9 connected with the output pin 3 of a NOR gate 84, which will be described subsequently. The output of the NOR gate 82 is applied directly to the input of the motor energizing circuit 24 and it is also applied through an inverting NOR gate 86 to the motor energizing circuit. The NOR gate 84 has an input pin 1 connected with the output of the overspeed comparator 14 and an input pin 2 connected directly to a reference position contact 116. A time constant circuit including a resistor 88 and a capacitor 90 is connected across the supply voltage and the junction thereof is connected with the input pin 2 of the NOR gate 84. The reference position contact 116 is engageable by a carrier contact 128 which is reversibly movable by the motor 132. The motor 132 also drives a throttle controller 92 in reversible directions. The output of the NOR gate 84 on pin 3 thereof as mentioned above is applied to input pin 9 of NOR gate 82 and also to input pin 5 of NOR gate 74.

The motor energizing circuit 24 comprises a transistor 94 having its base connected with the output pin 10 of the NOR gate 82 through a resistor 96. The collector of transistor 94 is connected with the forward terminal of the winding of motor 132 and the emitter of transistor is connected to ground. The common terminal of the motor 132 is connected with the positive terminal of a battery 96. Thus, the motor is energized in the forward direction when the transistor 94 is conductive. A transistor 98 has its base connected with the output pin 11 of the NOR gate 86 through a resistor 100. The collector of transistor 98 is connected to the reverse terminal of the winding of motor 132 for energization of the motor in the reverse direction. The energizing circuit for the motor 132 also includes a set of switch contacts 102 and 104 which are mounted on a carrier 106 which is reversibly movable by the motor 132. A switch contact 108 is adapted to engage either contact 102 or contact 104 and is movable by a suitable connection with a fly ball governor (not shown) responsive to vehicle speed. The emitter of transistor 98 is connected with contact 102 and the collector of transistor 94 is connected with contact 104. The contact 108 is connected with ground.

The operation of the governor control circuit will be described with reference to the drawing, assuming the exemplary values of parameters previously stated. Assume that the engine is being accelerated from some low value towards the governed speed. When it reaches 3400 RPM the speed signal voltage on pin 5 of the precall comparator 18 will cause the comparator to be switched from low to high. The capacitor 64 across the output of the precall comparator will start to charge through the resistor 62. Due to the time constant of the circuit, the capacitor voltage will reach a logic high state in 200 milliseconds. The output of the precall comparator is applied to pin 12 of the NOR gate 66. The close throttle comparator 16 has a high output when the speed is below 3600 RPM and it goes low when this speed is reached. The output of the close throttle comparator on pin 1 thereof is applied to pin 13 of NOR gate 66. Thus, the NOR gate 66 will have a high input on pin 13 until the speed reaches 3600 RPM. It will have a low input on pin 12 for 200 milliseconds after the speed reaches 3400 RPM and during this time delay the NOR gate 66 will have a low output on pin 11. The output on pin 11 is applied to the set input of the flip-flop 70; specifically, the output of the NOR gate 66 is applied to pin 8 of gate 72 across a capacitor C5. If the speed is still below 3600 RPM after the 200 millisecond time delay, the NOR gate 66 will remain low. In this event the control circuit will remain inactive and will not affect the operation of the governor under these conditions.

However, if the engine speed has accelerated from the precall speed of 3400 RPM to the close throttle speed of 3600 RPM within the 200 millisecond time delay, the NOR gate 66 will be switched from low to high. The high output of the NOR gate sets the flip-flop and the output thereof on pin 4 of gate 74 goes high and is applied to pin 5 of NOR gate 80. With the engine speed below the the governed speed of 4000 RPM, the governor comparator 12 has a low output on pin 13 and this is applied to pin 6 of gate 80. Accordingly, the high output of the flip-flop on pin 5 of gate 80 causes the output thereof on pin 4 to go from high to low. This output is applied to pin 8 of the gate 82. In this condition, pin 9 of gate 82 also is low because the output of the gate 84 is low. Pin 1 of gate 84 is held low by the output of the overspeed comparator 14 since the output of this comparator is low when the engine speed is less than 4300 RPM. Pin 2 of gate 84 is held high by the voltage across capacitor C6 since the carrier contact 128 and the reference contact 116 are open. Thus, the pins 8 and 9 of gate 82 are low and the output of the gate is high. This turns on the transistor 94 and drives the motor 132 in the close throttle direction. When the contact 128 reaches the reference position contact 116 the reference contact is grounded and this causes pin 2 on gate 84 to go low. Since pin 1 is also low, the output pin 3 of gate 84 goes high. The high output of the gate 84 is applied to the reset input of the flip-flop 70; specifically, pin 3 of IC 3—3 is connected with pin 5 of gate 74. The high output of the gate 84 thus resets the flip-flop to place it in readiness for operation as just described the next time the engine is accelerated from below the precall speed toward the close throttle speed. The high output of gate 84 is also applied to pin 9 of the gate 82 and causes the output thereof on pin 10 to go low. This turns off the transistor Q2 which stops energization of the motor in the close throttle direction. At the same time, the low output on pin 10 of gate 82 is applied to input pins 12 and 13 of the inverting gate 86 causing the output of pin 11 thereof to go high. This will turn on the transistor 98 if the contacts 102 and 108 are closed and will drive the motor 132 in the wide-open throttle direction. At the time the flip-flop is reset, the output thereof on pin 4 of gate 74 goes low and is applied to the input pin 5 of gate 80. Assuming that the engine speed is still below 4000 RPM, the output of governor comparator 12 is low and accordingly the output pin 4 of the gate 80 will be high and pin 8 of gate 82 will be high. At this time, i.e. upon reset of the flip-flop, contacts 116 and 128 are closed and pin 2 of gate 84 will be low and the output thereof will be high. Accordingly pin 9 of gate 82 will also be high and the output pin 10 thereof will be low so that the transistor 94 remains turned off.

As stated above, transistor 98 is turned on at this time, provided contacts 102 and 108 are closed, and the motor is energized in the open throttle direction. As soon as carrier contact 128 is moved out of contact with reference contact 116, the gate 84 will go low at output pin 3. This changes input pin 9 of gate 82 from high to low and pin 8 thereof will still be high, assuming that the engine speed is still below 4000 RPM. Accordingly, the output of gate 82 at pin 10 will remain low and transistor 94 will remain turned off.

As soon as the engine speed reaches 4000 RPM, the governor comparator 12 will go from low to high at its output pin 13. This will cause the gate 80 to go low at its output pin 4. Consequently both inputs to gate 82 will be low and the output on pin 10 thereof will go high. This turns on transistor 94 and turns off transistor 98 and energizes the motor 132 for rotation in the close throttle direction. The carrier contact 128 is displaced by the motor 132 until it reaches the reference contact 116 which connects pin 2 of gate 84 to ground. Thus, both input pins 1 and 2 of gate 84 are low and the output thereof on pin 3 will go high. This is applied to the input pin 9 of gate 82 and the output pin 10 goes low. When pin 10 goes low, transistor 94 is turned off and the motor 132 is no longer energized in the close throttle direction. Also, when output pin 10 on gate 82 goes low, the output of gate 86 goes high and turns on the transistor Q3 (assuming contacts 102 and 108 are closed) which energizes the motor 132 in the open throttle direction. The carrier contact 128 is thus displaced from the reference contact 116 and the input pin 2 of the gate 84 is switched from low to high causing the output of the gate 84 to switch back from high to low causing gate 82 to switch so that output pin thereof goes from low to high and turns on transistor 94 and turns off transistor 98. This process of switching the energization of the motor 132 in alternate directions continues as long as the engine speed remains in the governed speed range, namely from 4000 RPM up to the overspeed value of 4300 RPM. This mode of operation is known as the alternating circuit mode, since the motor 132 alternately drives the carrier contact 128 on and off the reference contact 116. The amount of movement of the carrier contact 128 and hence the throttle control means is very small and effectively keeps the carrier contact at the threshold of the reference position contact.

In the event that the engine speed should increase above overspeed value of 4300 RPM, as might be occasioned by change in engine loading, the overspeed comparator 14 is operative to terminate the alternating current mode of operation and reduce the engine operating speed. When the speed signal exceeds the overspeed value of 4300 RPM the overspeed comparator 14 switches from low to high on its output pin 14. The time constant circuit at the output of the comparator 14 is effective to provide a time delay of a few seconds before the logic high level is reached on the output pin 14. This time delay tends to stabilize the operation and prevent hunting of the system in the vicinity of the overspeed value of 4300 RPM. The high output of the overspeed comparator is applied to the input pin 1 of the gate 84 and holds this pin high as long as the engine speed exceeds 4300 RPM. Consequently, the output of gate 84 at pin 3 is held low regardless of whether carrier contact 128 is closed against reference contact 116. Therefore, as long as the engine speed exceeds 4300 RPM both inputs to gate 82 will be low and the output thereof will be high which turns on the transistor 94 and maintains the motor 132 energized in the close throttle direction. As soon as the engine speed decreases below the overspeed value of 4300 RPM, the overspeed comparator 14 will switch back from high to low and operation in the alternating circuit mode will be restored under the control of the governor comparator 80 as described above.

Although the description of this invention has been given with reference to a particular embodiment, it is not to be construed in a limiting sense. Many variations and modifications will now occur to those skilled in the art. For a definition of the invention, reference is made to the appended claims.

What is claimed is:

1. In a speed governing system for an engine having a throttle control means, a reversible motor adapted to be connected with said throttle control means, speed sensing means adapted to be connected with said engine for developing a speed voltage corresponding to engine speed, first and second switching means for energizing said motor respectively in the forward and reverse directions, first logic means operatively coupled with said sensing means and said switching means for energizing said motor in a close throttle direction when the engine speed exceeds a predetermined governed value, second logic means for energizing said motor in an open throttle direction when the throttle control means reaches a reference position whereby said motor is driven alternately in the close throttle and open throttle directions to cause the engine speed to be maintained in the vicinity of said governed value, and third logic means responsive to a predetermined value of acceleration of said engine for energizing said motor in the close throttle direction before said speed reaches said predetermined governed value and means including said second logic means for energizing said motor in the open throttle direction when the energization of said motor, in response to the third logic means, causes the throttle control means to reach said reference position, whereby the throttle control means enables continued acceleration toward said governed value.

2. The invention as defined in claim 1 comprising fourth logic means operatively coupled with said sensing means and said switching means and responsive to an overspeed value of engine speed for overriding said second logic means and maintaining energization of said motor in the close throttle direction until said throttle control means is moved beyond said reference position.

3. The invention as defined in claim 1 wherein said first logic means comprises a first level detector, and said third logic means comprises a second and third level detector, and time delay means coupled with the output of one of said second and third level detectors.

4. The invention as defined in claim 1 wherein said second logic means comprises first and second electrical switch contacts, the first contact being reversibly movable by said motor and adapted to engage the second contact when the first contact reaches said reference position.

5. The invention as defined in claim 2 wherein said first logic means comprises a first comparator, reference voltage means for applying a governed speed reference voltage to the first comparator, said third logic means comprises a second and third comparator, reference voltage means for applying a preset speed reference voltage to the second comparator, reference voltage means for applying a close throttle reference voltage to the third comparator, said fourth logic means comprising a fourth comparator, and reference voltage means for applying an overspeed reference voltage to the fourth comparator, and means for applying said speed voltage to each of said comparators.

6. The invention as defined in claim 5 including a logic gate having first and second inputs connected with the respective outputs of the second and third comparators, and a time constant circuit coupled with the output of the second comparator.

7. The invention as defined in claim 5 including first and second logic gates coupled between the output of the first comparator and the first switching means and an inverter coupled between the output of the second logic gate and the second switching means.

8. The invention as defined in claim 7 wherein said second logic means comprises first and second electrical contacts, the first contact being reversibly movable by said motor and adapted to engage the second contact when the first contact reaches said reference position, a third logic gate, said second contact being connected with an input of said third logic gate, the output of the third logic gate being connected with an input of said second logic gate.

9. The invention as defined in claim 8 including a fourth logic gate having first and second inputs connected with the respective outputs of the second and third comparators, a time constant circuit coupled with the output of the second comparator, a flip-flop having a set input connected with the output of said fourth logic gate and a reset input connected with the output of said third logic gate, the output of said flip-flop being connected with one input of said first logic gate.

10. The invention as defined in claim 9 wherein the output of said fourth comparator is connected with an input of said third logic gate, and a time constant circuit coupled with the output of said fourth comparator.

* * * * *